US007555001B2

(12) United States Patent
Coppola et al.

(10) Patent No.: US 7,555,001 B2
(45) Date of Patent: Jun. 30, 2009

(54) ON-CHIP PACKET-SWITCHED COMMUNICATION SYSTEM

(75) Inventors: Marcello Coppola, Moirand (FR);
Riccardo Locatelli, Grenoble (FR);
Giuseppe Maruccia, Grenoble (FR);
Lorenzo Pieralisi, Seyssins (FR)

(73) Assignee: STMicroelectronics SA, Montrouge (FR)

( * ) Notice: Subject to any disclaimer, the term of this patent is extended or adjusted under 35 U.S.C. 154(b) by 624 days.

(21) Appl. No.: 11/157,562

(22) Filed: Jun. 21, 2005

(65) Prior Publication Data
US 2005/0286543 A1  Dec. 29, 2005

(30) Foreign Application Priority Data
Jun. 24, 2004 (EP) .................... 04291588

(51) Int. Cl.
*H04L 12/28* (2006.01)
*H04L 12/56* (2006.01)

(52) U.S. Cl. .................. 370/425; 370/392; 370/407; 370/409

(58) Field of Classification Search ............ 370/389, 370/392, 400, 401–407, 409, 425
See application file for complete search history.

(56) References Cited

U.S. PATENT DOCUMENTS 6,975,588 B1 * 12/2005 Katukam et al. ............ 370/222
7,027,390 B2 * 4/2006 Wakai et al. ................ 370/218
7,307,947 B2 * 12/2007 Okuno ....................... 370/222

FOREIGN PATENT DOCUMENTS

EP   1257100   11/2002

OTHER PUBLICATIONS

W.J. Dally, C.L. Seitz, "Deadlock-Free Message Routing in Multi-processor Interconnection Networks," IEEE Transactions on Computers, May 1987 (vol. 36 No. 5) pp. 547-553.
Dally et al., Route Packets, Not Wires: On-Chip Interconnection Networks, Proceedings of the 38th Annual Design Automation Conference (DAC), Las Vegas, NV, Jun. 18-22, 2001, vol. CONF. 38, pp. 689-689.

(Continued)

*Primary Examiner*—Ronald Abelson
(74) *Attorney, Agent, or Firm*—Lisa K. Jorgenson; Allen, Dyer, Doppelt, Milbrath & Gilchrist, P.A.

(57) ABSTRACT

A system for routing a data packet between N elements includes N network interfaces respectively connected to the N elements, with N being an even integer, and an on-chip packet-switched communication network arranged in a ring structure. The packet-switched communication network includes N routers respectively connected to the N interfaces, and N pairs of opposite uni-directional ring links. Each pair of ring links couples two adjacent routers in the ring structure, and each ring link provides two virtual channels. There are N/2 pairs of opposite uni-directional crossing links, with each pair of crossing links coupling two diametrically opposite routers in the ring structure. Processing circuitry is distributed within the N routers and the N network interfaces for determining direction of the data packet to be transmitted over a path from a source element to a destination element in the ring structure, and for determining at each router in the path which virtual channel is to be used to avoid deadlocks in the transmission.

17 Claims, 8 Drawing Sheets

OTHER PUBLICATIONS

Ye et al., Packetization and Routing Analysis of On-Chip Multiprocessor Networks, Journal of Systems Architecture, Elsevier Science Publishers Bv., Amsterdam, NL, vol. 50, No. 2-3, Feb. 2004, pp. 81-104.

Karim et al., On-Chip Communication Architecture for OC-768 Network Processors, Proceedings of the 38th Annual Design Automation Conference (DAC), Las Vegas, NV, Jun. 18-22, 2001, vol. CONF. 38, pp. 678-683.

* cited by examiner

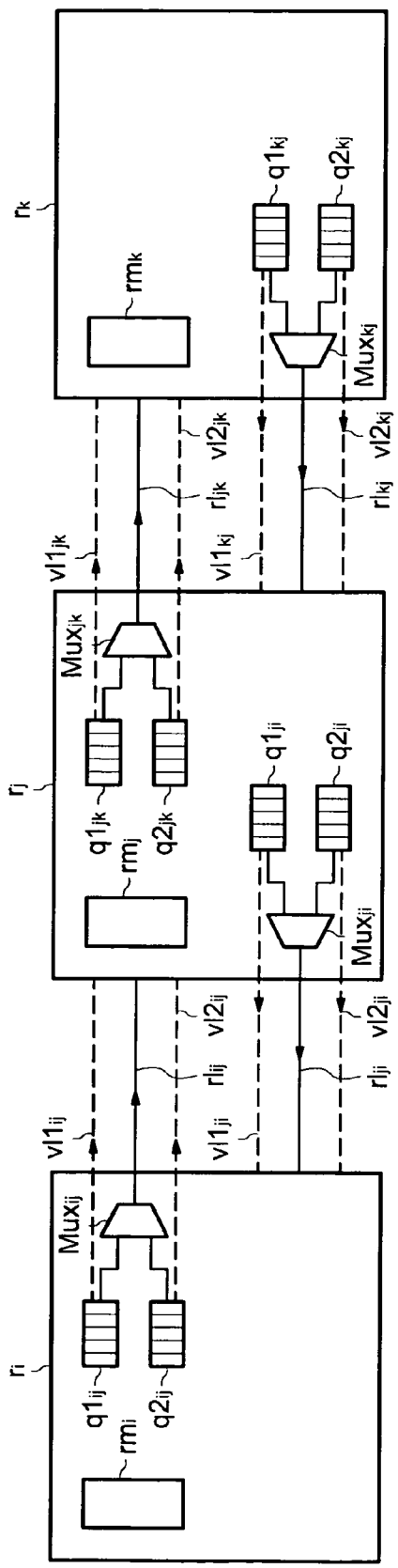

ON-CHIP PACKET-SWITCHED COMMUNICATION SYSTEM

FIELD OF THE INVENTION

The present invention relates in general to on-chip communication networks, and more particularly, to a packet-switched network.

BACKGROUND OF THE INVENTION

There are two fundamental approaches toward building a network core: circuit switching and packet switching. In circuit-switched networks, the resources needed along a path (buffers, links) for providing communication between the end systems are reserved for the duration of the communication session.

European Patent No. 1,257,100 discloses a circuit-switched network, partly scalable, with a number of the nodes being a multiple of eight. More precisely, eight nodes form a ring. It is necessary to connect several different rings with each other when more than eight nodes (still multiple of eight) are to be used In packet-switched networks, the resources are not reserved. Packets use the resources on demand, and as a consequence, may not have to wait for access to a communication link. However, in conventional packet-switched networks, problems exist, such as a lack of scalability and deadlock.

Deadlock is a situation where a group of data packets are unable to make progress because they are waiting on one another. In other words, a data packet is unable to make progress because other data packets block resources which are necessary for the data packet to progress toward its destination.

Approaches exist, including a general purging of resources, but this causes a loss of data. Moreover, the current shared bus systems show their limitations in terms of performance, scalability, power consumption and reliability.

SUMMARY OF THE INVENTION

An object of the present invention is to provide an on-chip communication architecture based on micro-networks implementing a flexible packet-switched communication, which is free of deadlock.

Another object of the present invention is to provide a scalable packet-switched system having a low cost, even if the number of nodes is large, such as more than eight, for example.

The system for routing data packets between elements comprises N network interfaces respectively adapted to be connected to N elements, with N being an even integer, and an on chip packet-switched communication network is arranged in a unique ring structure.

The ring structure includes N routers respectively connected to the N interfaces, and N pairs of opposite uni-directional ring links. Each ring link may carry two virtual channels, and one pair of ring links may couple two adjacent routers on the ring. The ring structure may also include N/2 pairs of opposite uni-directional crossing links, with one pair of crossing links coupling two diametrically opposite routers of the ring.

The system may further comprise processing means or circuitry, distributed within the routers and the network interfaces, and adapted upon the presence of a data packet to be transmitted from a source element to a destination element. This determines the direction characteristics of the path of the data packet on the ring, and if necessary, to determine at each router belonging to the path which virtual channel is to be used so as to avoid deadlocks in the transmission.

The system thus combines a unique ring regardless of the value of N, two virtual channels per each ring link, and an appropriate determination of the path within the ring structure using the virtual channels. Of course, the ring according to the invention is not necessarily circular and can have, once implemented on the chip, any geometrical form.

According to a preferred embodiment of the invention, which permits any deadlock to be easily avoided, the processing is adapted to define the path for the transmitted data packet, such that the path includes at least one transition on the ring between two adjacent routers, or a crossing transition between two diametrically opposite routers followed by a circular path on the ring having at least one transition. The direction of a circular path is identical for all the transitions of the circular path.

A circular path is a path on the ring, regardless of the geometrical form of the ring. The choice between the two virtual channels, if necessary, is a function of the index of the router on the ring, for example.

According to a preferred embodiment, the processing may be adapted to define the path for the transmitted data packet, such that the path comprises at the most d transitions between routers, with d being equal to ceil (N/4).

According to one embodiment, a data packet may comprise a header including a first field defining the presence of a crossing transition and/or the direction of a circular path on the ring, and a second field defining the destination router. The distributed processing comprises local preprocessing modules in the network interfaces. The local preprocessing module of the network interface connected to the source element is adapted for determining the content of the first field and the second field. The processing may also comprise a local router within the routers for routing such data packets in accordance with the content of the first and second fields.

In a preferred embodiment, the successive routers may be indexed with consecutive indexes, and the local preprocessing module of the source network interface may comprise a calculating module for calculating a value r equal to the difference modulo N between the index of the destination router and the index of the source router, and a determining module for determining the content of the first field from the value of r.

Advantageously, the indexes may be increased in the right or clockwise direction, and the determining module may be adapted to provide the content of the first field with a plurality of different values. The different values are discussed below.

A first value is representative of the right or clockwise direction on the ring if the value r belongs to the set {1, 2, . . . ,d}. A second value is representative of the left or counter-clockwise direction on the ring if the value r belongs to the set {N−d,N−d+1, . . . ,N−1}. A third value is representative of the crossing transition between two diametrically opposite routers if the value r is equal to N/2.

A fourth value is representative of the crossing transition between two diametrically opposite routers followed by the left or counter-clockwise direction on the ring if the value r belongs to the set {d+1,d+2 . . . ,N/2−1}. The fifth value is representative of the crossing transition between two diametrically opposite routers followed by the right or clockwise direction on the ring otherwise if the value r belongs to the set {N/2+1,N/2+2, . . . ,N−d−1}.

Furthermore, each router may be adapted for routing the data packet to its coupled network interface if the index of the corresponding router is equal to the content of the second field of the header of the data packet. Otherwise, each router may route the data packet according to the content of the first field of the header of the data packet on a first virtual channel if the index is greater than the content of the second field of the header of the data packet, and on a second virtual channel otherwise.

Each router may comprise at least two queues connected to a uni-directional ring link connected to the router. Each virtual channel may be defined by at least one queue and the corresponding uni-directional ring link.

Advantageously, indexes may be binary encoded, and the routers may be adapted to process indexes with the last ceil ($\log_2(d)$) bits of the indexes. Reducing the size of this data optimizes the use of the bandwidth of the network, and the processing time.

BRIEF DESCRIPTION OF THE DRAWINGS

Other advantages and features of the invention will appear on examining the detailed description of embodiments, which are in no way limiting, and of the appended drawings in which:

FIG. 2 illustrates routers with virtual channels for the system shown in FIG. 1;

DETAILED DESCRIPTION OF THE PREFERRED EMBODIMENTS

Figure 1:
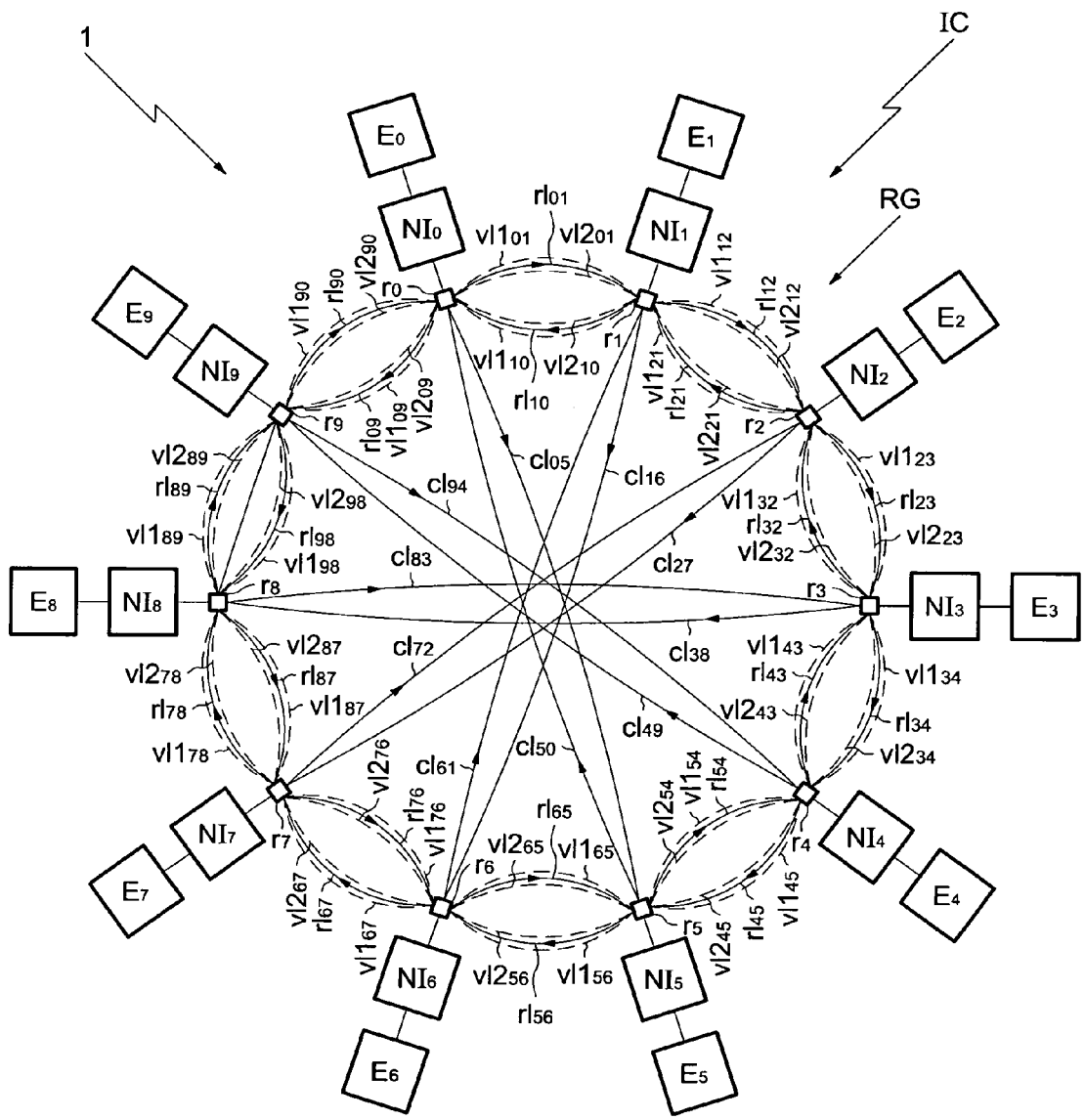
FIG. 1 illustrates a system according to the present invention.

Referring now to FIG. 1, the illustrated system 1 is incorporated on a chip IC. The system comprises N=10 routers $r_0, r_1, \ldots, r_{N-1}$ indexed from 0 to N−1=9 in the clockwise or right direction. Each of the routers $r_0, r_1, \ldots, r_{N-1}$ is connected to a respective network interface $NI_0, NI_1, \ldots, NI_{N-1}$. Each of the network interfaces $NI_0, NI_1, \ldots, NI_{N-1}$ is connected to a corresponding element $E_0, E_1, \ldots, E_{N-1}$. Elements $E_0, E_1, \ldots, E_{N-1}$ can be, for example, a processor, a memory, an input, an output, a sub-system bus, or any other element.

The routers $r_0, r_1, \ldots, r_{N-1}$ form a unique ring RG. Two adjacent routers $r_i, r_j$ of the ring RG are linked with a pair of opposite uni-directional ring links $rl_{ij}$ (from $r_i$ to $r_j$) and $rl_{ji}$ (from $r_j$ to $r_i$). Each ring link $rl_{kl}$ carries two virtual channels $vl1_{kl}, vl2_{kl}$.

More precisely, FIG. 2 represents three adjacent routers $r_i, r_j, r_k$ of the ring RG. Each router of the system comprises a routing circuit $rm_i$. Each router further comprises at least two queues $q1_{ij}, q2_{ij}$ and a multiplexer $Mux_{ij}$ connected to the uni-directional ring link for transmitting a data packet from a router $r_i$ to a router $r_j$. The multiplexer $Mux_{ij}$ is controlled by the routing circuit $rm_i$. Each of the at least two queues $q1_{ij}, q2_{ij}$ permits definition of a virtual channel associated with the uni-directional ring link. Each virtual channel has at least one queue, and each uni-directional ring link $rl_{ij}$ has two virtual channels $vl1_{ij}, vl2_{ij}$.

Referring back to FIG. 1, two routers $r_i$ and $r_j$, diametrically opposite each other (j−i) mod N=N/2) on the ring RG are linked with a pair of opposite uni-directional crossing links $cl_{ij}$ (from $r_i$ to $r_j$) and $cl_{ji}$ (from $r_j$ to $r_i$).

Figure 3A:
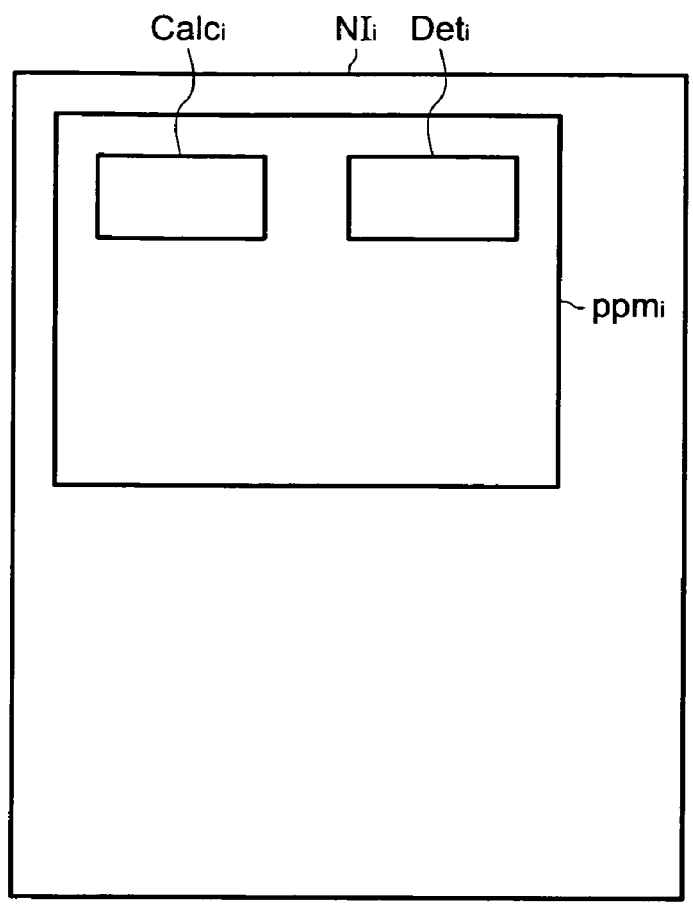
FIG. 3a illustrates a network interface for a system according to the present invention.

In FIG. 3a, a network interface $NI_i$ is illustrated in greater detail. The system comprises processing circuitry, which is distributed within the routers $r_0, r_1, \ldots, r_{N-1}$, and the network interfaces $NI_0, NI_1, \ldots, NI_{N-1}$. More precisely, the processing circuitry comprises N identical local preprocessing modules $ppm_0, ppm_1, \ldots, ppm_{N-1}$ located within the N network interfaces $NI_0, NI_1, \ldots, NI_{N-1}$, and N identical routing modules $rm_0, rm_1, \ldots, rm_{N-1}$ located within the N routers $r_0, r_1, \ldots, r_{N-1}$. The processing circuitry is adapted to determine the path of a data packet P from a source element $E_{source}$ to a destination element $E_{destination}$ of the system.

The path comprises at most d transitions between routers, with d being equal to ceil(N/4). The ceil function of a variable x, when y−1<x<y, is equal to y, with x being a real number and y being an integer number.

Figure 3B:
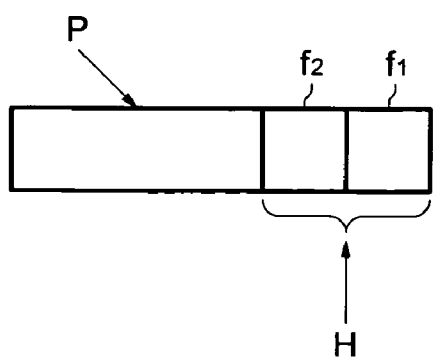
FIG. 3b illustrates a data packet according to the present invention.

As illustrated in FIG. 3b, a data packet P comprises a header H having a first field $f_1$ and a second field $f_2$. The network interface $NI_i$ of a source element $E_{source}$ comprises a preprocessing module $ppm_{source}$ which is capable of determining the content of the two fields $f_1, f_2$ of the header H of the data packet P for a data packet P to be transmitted. The first field $f_1$ defines the presence of a crossing transition and/or the direction of a circular path on the ring RG. Once on the ring, the data packet P keeps the same sense clockwise or counter-clockwise. The second field $f_2$ contains the index of the destination router $r_{destination}$ corresponding to the destination network interface $NI_{destination}$ and the destination element $E_{destination}$ with its index.

Preprocessing modules $ppm_0, ppm_1, \ldots, ppm_{N-1}$ use a specific process to determine the content of the two fields $f_1, f_2$ of the header H of the data packet P to be transmitted from a source network interface $NI_{source}$ to a destination network interface $NI_{destination}$. Each preprocessing means $ppm_i$ comprises a calculating module $Calc_i$ which calculates a value r equal to the difference between the index of the destination router and the index of the source router modulo N: r=(destination−source) modulo N.

Furthermore, each preprocessing module $ppm_i$ comprises a determining module $Det_i$ for determining the content of the first field $f_1$ from the value of r. More precisely:

If r belongs to the set {1,2, . . . ,d}, a first value R representative of the right or clockwise direction on the ring RG is set to the first field $f_1$.

If r belongs to the set {N−d,N−d+1, . . . ,N−1}, a second value L representative of the left or counter-clockwise direction on the ring RG is set to the first field $f_1$.

If r is equal to N/2, a third value A representative of the crossing ring direction RG is set to the first field $f_1$.

If r belongs to the set {d+1,d+2 . . . ,N/2−1}, a fourth value (AL) representative of the crossing ring direction followed by the left or counter-clockwise direction on the ring RG is set to the first field $f_1$.

A fifth value AR representative of the crossing ring direction followed by the right or clockwise direction on the ring is otherwise set to the first field $f_1$, i.e., if r belongs to the set {N/2+1,N/2+2, . . . ,N−d−1}.

In the present example, the direction (R,L) corresponds to the increasing indexation direction of the routers $r_0, r_1, \ldots, r_{N-1}$. If the indexation direction is opposite, the content of the field $f_1$ has the opposite value.

There are five possible values for the content of the first field $f_1$. Theoretically, three bits are necessary, but it is advantageously possible to encode the first field $f_1$ on 2 bits. This is because the case of the third value A can be joined either with the case of the fourth value AL, or with the case of the fifth value AR. In case A, after the crossing transition, the data packet P will be directly send to the corresponding network interface.

An example of an algorithm illustrating this method, wherein case A (only a crossing transition) is joined with case AL (a crossing transition followed by at least one transition in the left or counter-clockwise direction on the ring RG) is shown below:

```
r ←(destination − source) mod N;
if ( r ∈ {1,2,3,...,d} )
   then
      f₁ ←R;
   else
      if ( r ∈ {N−1,N−2,N−3,...,N−d} )
         then
            f₁ ←L;
         else
            if ( r ∈ {d+1,d+2,...,N/2} )
               then
                  f₁ ←AL;
               else
                  f₁ ←AR;
            endif;
      endif;
endif;
```

Each routing module $rm_i$ is capable of routing the data packet to its coupled network interface if the index i of the corresponding router is equal to the content (destination) of the second field $f_2$ of the header H of the data packet P. Otherwise, if its index i is greater than the content (destination) of the second field $f_2$ of the header H of the data packet P, the routing module $rm_i$ routes the data packet P on the first virtual channel. If the destination is greater than its index I, then the routing module $rm_i$ routes the data packet P on the second virtual channel.

In fact, the choice of a virtual channel corresponds to the choice of the corresponding queue for temporary storing the data packet P before its transmission on the ring link.

An example of an algorithm implemented in the routing module and illustrating this method is:

```
if ( i = f₂ )
   then
      route packet P to the NIᵢ direction;
   else
      if ( i > f₂ )
         then
            route packet P according to f₁ and
            on the corresponding first virtual channel;
         else
            route packet P according to f₁ and
            on the corresponding first virtual channel;
      endif;
endif;
```

The preprocessing modules and the routing modules can be implemented by software within microcontrollers, or can be realized with logic circuits by using, for example, logic synthesis tools from the algorithm described above and converted in a specific language, like VHDL.

Furthermore, all indexes used in the invention are binary encoded with bits. However, the routing modules need to use, because there is at the most d transitions in a path, only the last $\text{ceil}(\log_2(d))$ bits.

This topology of the network associated to a method for routing data packets permits deadlock problems to be avoided. The resource dependency graph, in which the virtual channel dependency graph has no cycle, the corresponding network is deadlock free. The generic scalable network proposed in this invention has a channel dependency graph cycle free, in particular, because of the use of two virtual channels per uni-directional ring link and because of the fact that a crossing transition is always performed before eventual transitions on a circular path.

Figure 4:
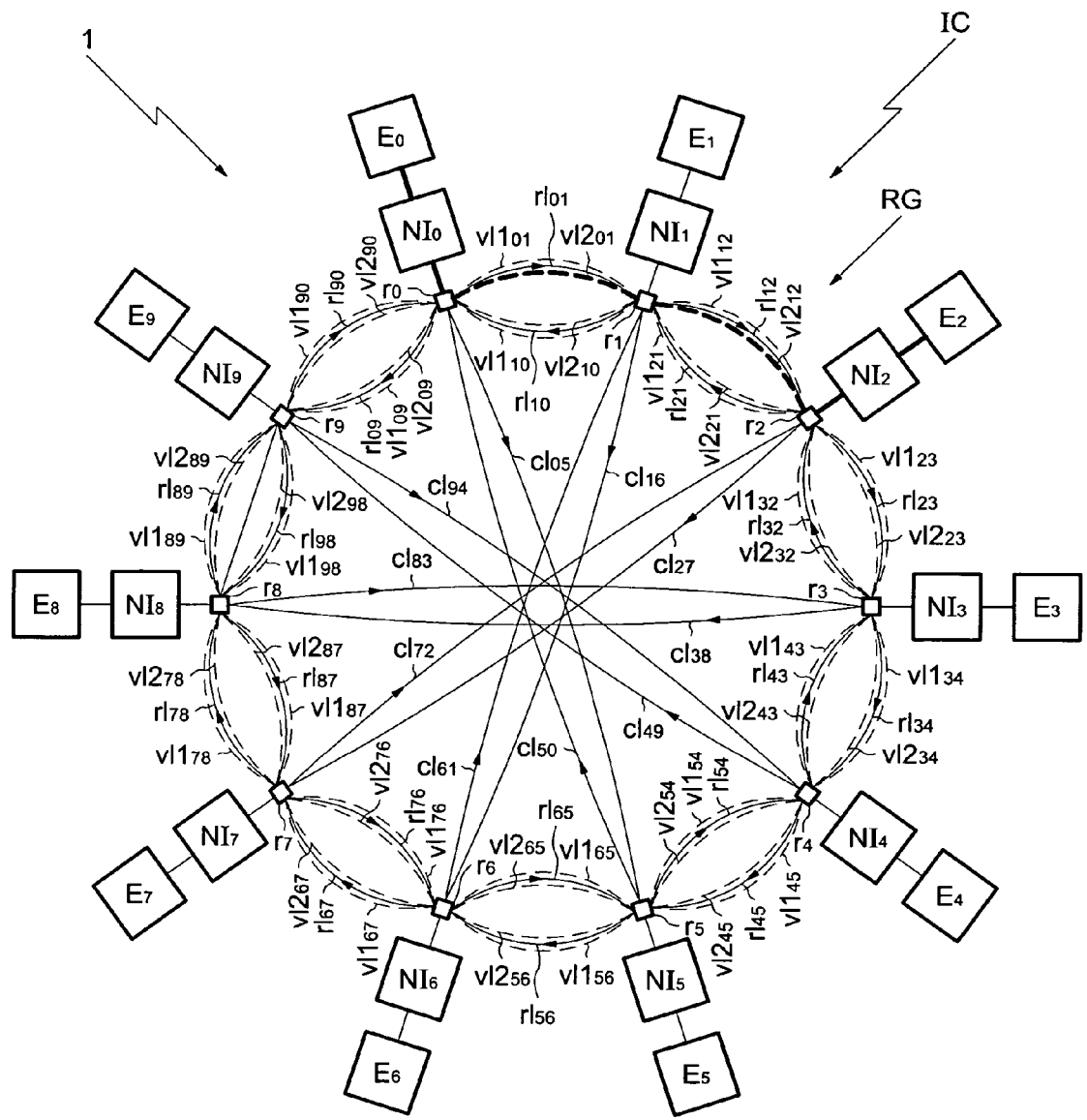
FIG. 4 illustrates a first path for a packet according to the present invention.

Five cases of a data packet transmission according to the invention will be now illustrated. In FIG. 4, the path of a data packet P from the source element $E_0$ to the destination element $E_2$ is highlighted. The preprocessing module $ppm_0$ of the network interface $NI_0$ sets the value R in the first field $f_1$ of the header H of the data packet P. Then the routing module $rm_0$ of the router $r_0$ sends the data packet P on the ring RG in the right or clockwise direction R on the second virtual channel $vl2_{01}$. The router $r_1$ receives the data packet P. The routing module $rm_1$ of the router $r_1$ sends the data packet P on the ring RG in the right direction R on the second virtual channel $vl2_{12}$. When the data packet P is received by the routing module $rm_2$ of the router $r_2$, this data packet P is transmitted to the network interface $NI_2$ to the destination element $E_2$.

Figure 5:
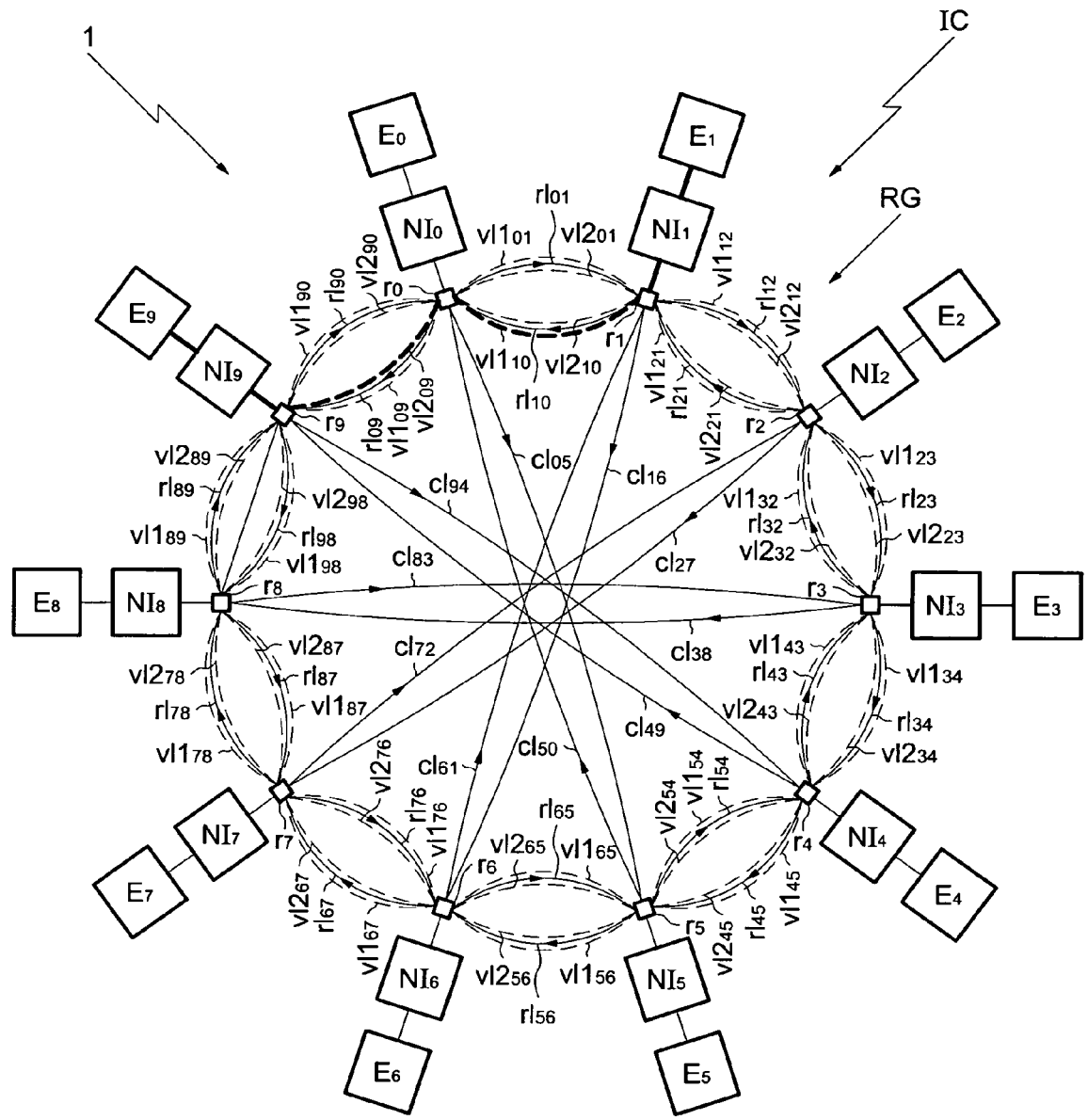
FIG. 5 illustrates a second path for a packet according to the present invention.

In FIG. 5, the path of a data packet P from the source element $E_1$ to the destination element $E_9$ is highlighted. The preprocessing module $ppm_1$ of the network interface $NI_1$ sets the value L in the first field $f_1$ of the header H of the data packet P. Then the routing module $rm_1$ of the router $r_1$ sends the data packet P on the ring RG in the left or counter-clockwise direction L on the first virtual channel $vl1_{10}$. The router $r_0$ receives the data packet P. The routing module $rm_0$ of the router $r_0$ sends the data packet P on the ring RG, in the left direction L, on the second virtual channel $vl2_{09}$. When the data packet P is received by the routing module $rm_9$ of the router $r_9$, this data packet P is transmitted to the network interface $NI_9$ to the destination element $E_9$.

Figure 6:
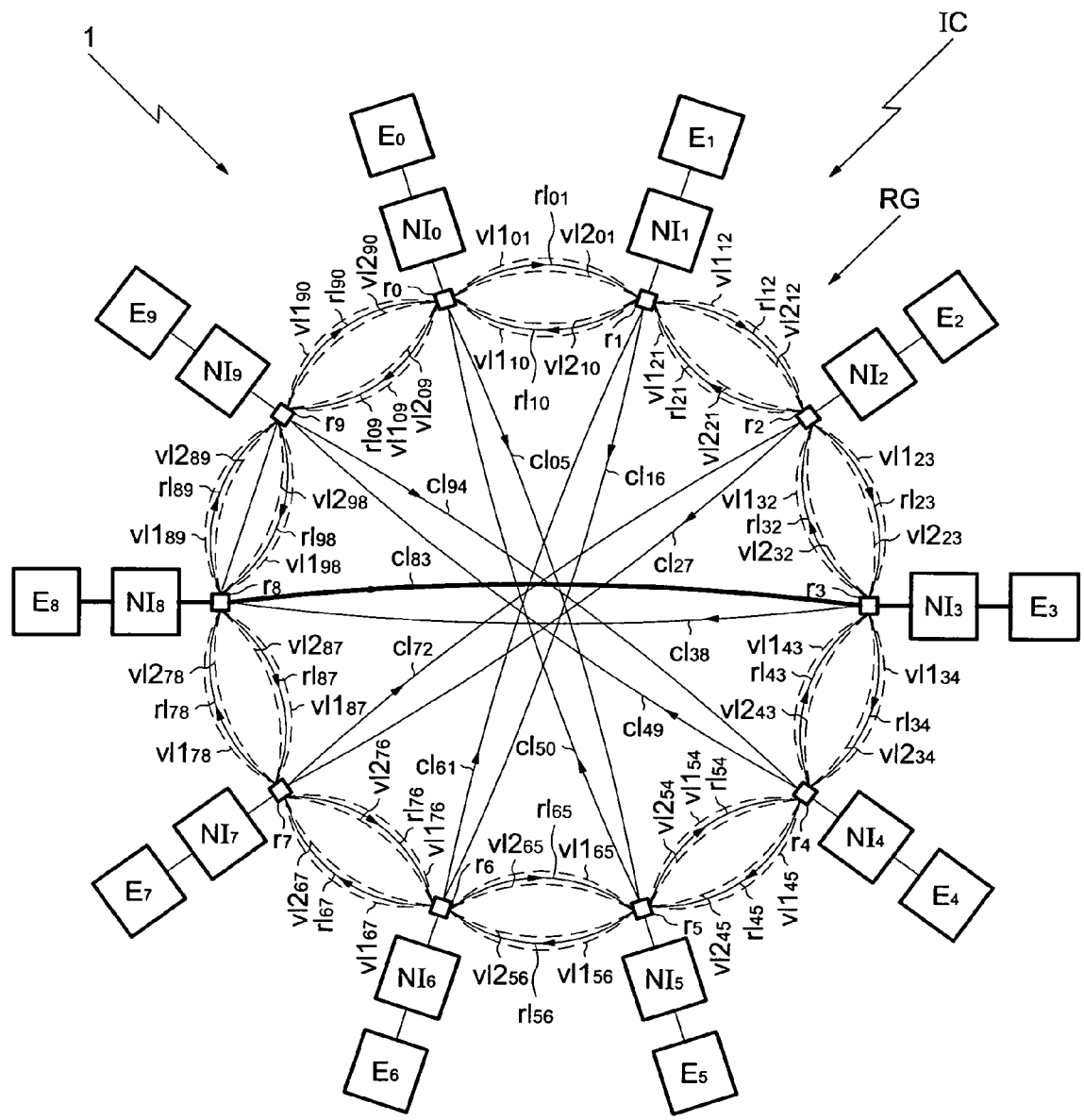
FIG. 6 illustrates a third path for a packet according to the present invention.

In FIG. 6, the path of a data packet P from the source element $E_8$ to the destination element $E_3$ is highlighted. The preprocessing module $ppm_8$ of the network interface $NI_8$ sets the value A in the first field $f_1$ of the header H of the data packet P. Then the routing module $rm_8$ of the router $r_8$ sends the data packet P on the crossing link $cl_{83}$. The router $r_3$ receives the data packet P. The routing module $rm_3$ of the router $r_3$ then transmits the data packet P to the network interface $NI_3$ to the destination element $E_3$.

Figure 7:
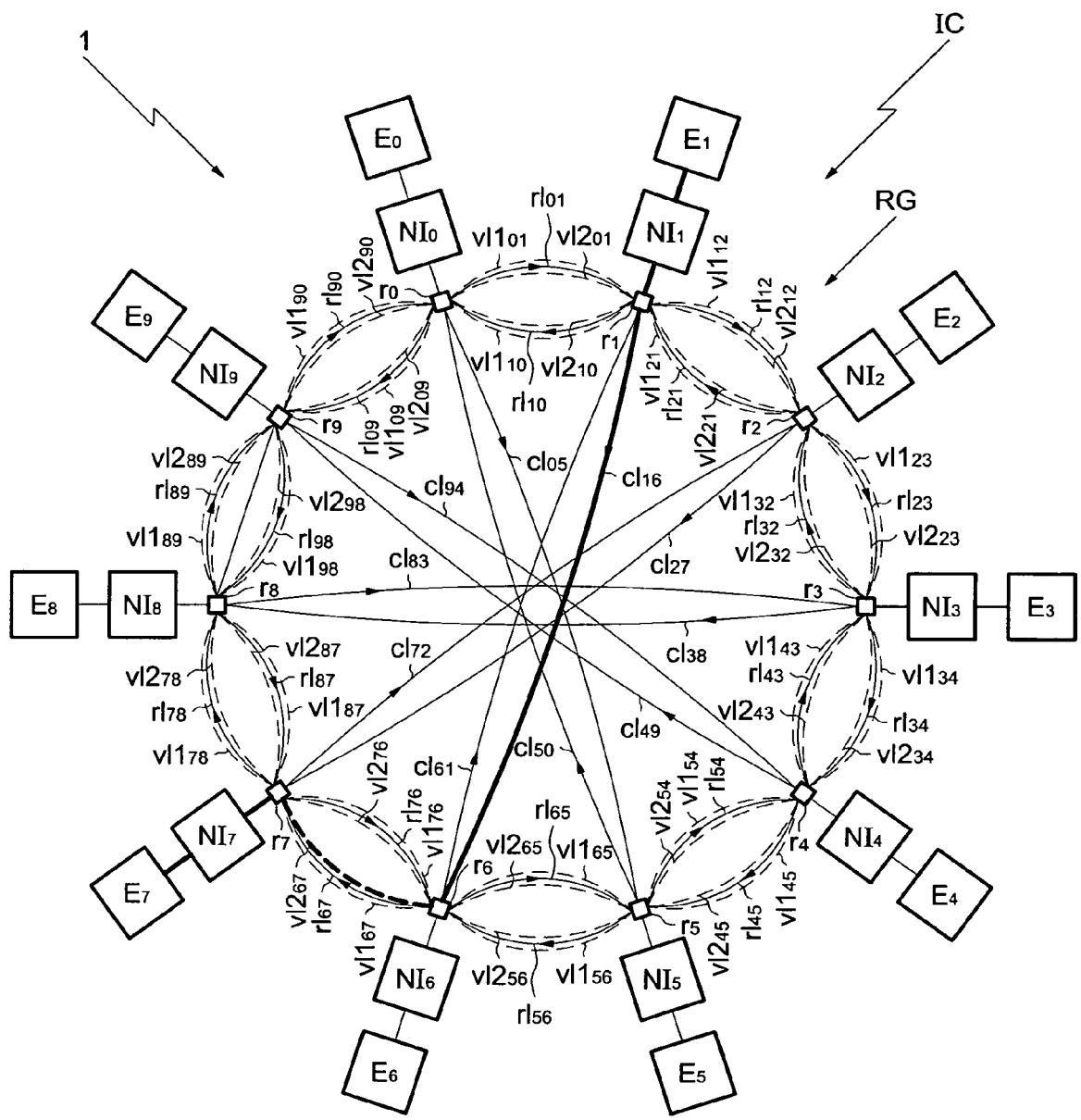
FIG. 7 illustrates a fourth path for a packet according to the present invention.

In FIG. 7, the path of a data packet P from the source element $E_1$ to the destination element $E_7$ is highlighted. The preprocessing module $ppm_1$ of the network interface $NI_1$ sets the value AR in the first field $f_1$ of the header H of the data packet P. Then the routing module $rm_1$ of the router $r_1$ sends the data packet P on the crossing link $cl_{16}$. The router $r_6$ receives the data packet P. The routing module $rm_6$ of the router $r_6$ sends the data packet P on the ring RG in the right direction R on the second virtual channel $vl2_{67}$. When the data packet P is received by the routing module $rm_7$ of the router $r_7$, this data packet P is transmitted to the network interface $NI_7$ to the destination element $E_7$.

Figure 8:
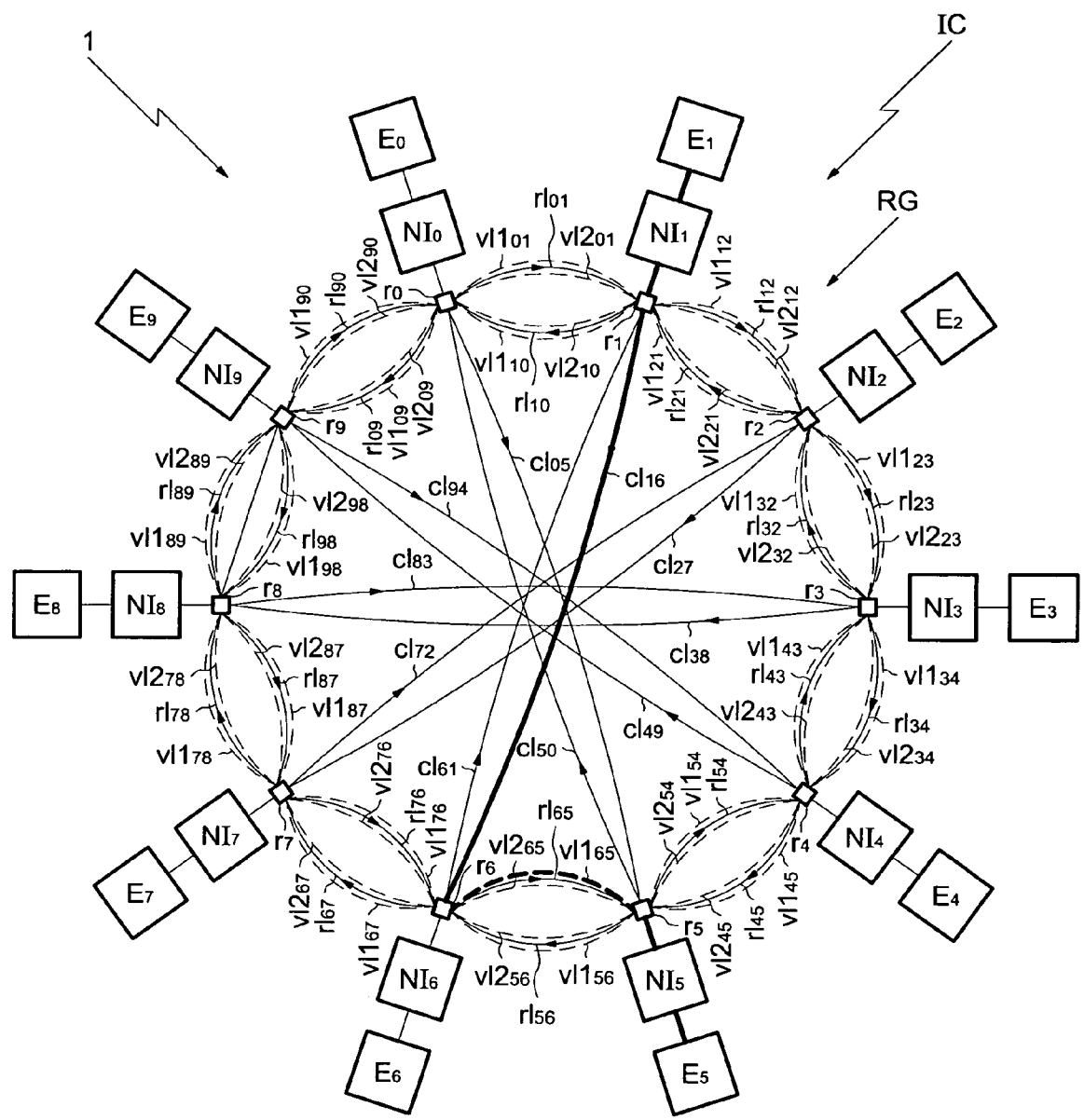
FIG. 8 illustrates a fifth path for a packet according to an aspect of the invention.

Finally, in FIG. 8, the path of a data packet P from the source element $E_1$ to the destination element $E_5$ is highlighted. The preprocessing module $ppm_1$ of the network interface $NI_1$ sets the value AL in the first field $f_1$ of the header H of the data packet P. Then the routing module $rm_1$ of the router $r_1$ sends the data packet P on the crossing link $cl_{16}$. The router $r_6$ receives the data packet P. The routing module $rm_6$ of the router $r_6$ sends the data packet P on the ring RG in the left direction L on the first virtual channel $vl1_{65}$. When the data packet P is received by the routing module $rm_5$ of the router $r_5$, this data packet P is transmitted to the network interface $NI_5$ to the destination element $E_5$.

That which is claimed is:

1. A system for routing a data packet between N elements comprising:
   N network interfaces respectively connected to the N elements, with N being an even integer; and
   an on-chip packet-switched communication network arranged in a ring structure comprising
      N routers respectively connected to said N network interfaces,
      N pairs of opposite unidirectional ring links, with each pair of ring links coupling two adjacent routers in the ring structure, and each ring link providing two virtual channels, and
      N/2 pairs of opposite uni-directional crossing links, with each pair of crossing links coupling two diametrically opposite routers in the ring structure; and
   processing circuitry distributed within said N routers and said N network interfaces for
      determining a direction of the data packet to be transmitted over a path from a source element to a destination element in the ring structure so as to avoid a deadlock with other data packets being transmitted,
      determining at each router in the path which virtual channel is to be used, and
      defining the path for the transmitted data packet so that the path includes at least one transition in the ring structure between two adjacent routers, or a crossing transition between two diametrically opposite routers followed by a circular path in the ring structure having at least one transition, with a direction of the circular path being identical for all transitions in the circular path;
   the data packet comprising a header including a first field defining at least one of the crossing transitions and the direction of the circular path in the ring structure, and a second field defining a destination router;
   said processing circuitry comprising N local preprocessing modules respectively in said N network interfaces, with one of said local preprocessing modules being connected to the source element for determining contents of the first and second fields; and
   each router comprising a routing module for routing the data packet based upon the contents of the first and second fields.

2. A system according to claim 1, wherein said processing circuitry defines the path for the transmitted data packet so that the path comprises at most d transitions between routers, with d being equal to N/4.

3. A system according to claim 1, wherein said N routers are successive and are indexed with consecutive indexes; and wherein a source network interface corresponds to the source element, with said local preprocessing module in the source network interface comprising:
   a calculating module for calculating a value r equal to a difference modulo N between a destination index of the destination router and a source index of the source router; and
   a determining module for determining the content of the first field from the value r.

4. A system according to claim 3, wherein the indexes are increased in a clockwise direction; and wherein said determining module provides the content of the first field with the following:
   a first value representative of the clockwise direction in the ring structure if the value r belongs to the set $\{1,2,\ldots,d\}$;
   a second value representative of a counterclockwise direction in the ring structure if the value r belongs to the set $\{N{-}d, N{-}d{+}1,\ldots,N{-}1\}$;
   a third value representative of a crossing in the ring direction if the value r is equal to N/2;
   a fourth value representative of the crossing transition between two diametrically opposite routers followed by the counter-clockwise direction in the ring structure if the value r belongs to the set $\{d{+}1, d{+}2\ldots,N/2{-}1\}$; or
   a fifth value representative of the crossing transition between two diametrically opposite routers followed by the clockwise direction in the ring structure if the value r belongs to the set $\{N/2{+}1,N/2{+}2,\ldots,N{-}d{-}1\}$.

5. A system according to claim 4, wherein each routing module performs the following:
   routing the data packet to its paired network interface if the index of the corresponding router is equal to the content of the second field of the header of the data packet; and
   routing the data packet according to the content of the first field of the header of the data packet on a first virtual channel if the index is greater than the content of the second field of the header of the data packet, otherwise on a second virtual channel.

6. A system according to claim 1, wherein each router comprises at least two queues connected to a unidirectional ring link connected thereto, and each virtual channel being defined by at least one queue and the corresponding unidirectional ring link.

7. A system according to claim 3, wherein the indexes are binary encoded, and said routing modules only process the indexes with the last $\log_2(d)$ bits of the indexes.

8. A packet-switched communication network comprising:
   a substrate;
   N network interfaces on said substrate, with N being an even integer, and each network interface to be connected to an element;
   N routers arranged in a ring structure on said substrate and respectively connected to said N network interfaces;
   N pairs of opposite uni-directional ring links, with each pair of ring links coupling two adjacent routers in the ring structure, and each ring link providing two virtual channels;
   N/2 pairs of opposite uni-directional crossing links, each pair of crossing links coupling two diametrically opposite routers in the ring structure; and
   processing circuitry distributed within said N routers and said N network interfaces for
      determining a path for a data packet to be transmitted from a source element to a destination element in the ring structure so as to avoid a deadlock with other data packets being transmitted,
      determining at each router in the path which virtual channel is to be used, and
      defining the path for the transmitted data packet so that the path includes at least one transition in the ring structure between two adjacent routers, or a crossing transition between two diametrically opposite routers followed by a circular path in the ring structure having at least one transition, with a direction of the circular path being identical for all transitions in the circular path;

the data packet comprising a header including a first field defining at least one of the crossing transitions and the direction of the circular path in the ring structure, and a second field defining a destination router;

said processing circuitry comprising N local preprocessing modules respectively in said N network interfaces, with one of said local preprocessing modules being connected to the source element for determining contents of the first and second fields; and each router comprising a routing module for routing the data packet based upon the contents of the first and second fields.

9. A packet-switched communication network according to claim 8, wherein said processing circuitry defines the path for the transmitted data packet so that the path comprises at most d transitions between routers, with d being equal to N/4.

10. A packet-switched communication network according to claim 8, wherein said N routers are successive and are indexed with consecutive indexes; and wherein a source network interface corresponds to the source element, with said local preprocessing module in the source network interface comprising:

a calculating module for calculating a value r equal to a difference modulo N between a destination index of the destination router and a source index of the source router; and a determining module for determining the content of the first field from the value r.

11. A packet-switched communication network according to claim 10, wherein the indexes are increased in a clockwise direction; and wherein said determining module provides the content of the first field with the following:

a first value representative of the clockwise direction in the ring structure if the value r belongs to the set $\{1,2,\ldots,d\}$;

a second value representative of a counter-clockwise direction in the ring structure if the value r belongs to the set $\{N-d, N-d+1, \ldots, N-1\}$;

a third value representative of a crossing in the ring direction if the value r is equal to N/2;

a fourth value representative of the crossing transition between two diametrically opposite routers followed by the counter-clockwise direction in the ring structure if the value r belongs to the, set $\{d+1, d+2\ldots, N/2-1\}$; or a fifth value representative of the crossing transition between two diametrically opposite routers followed by the clockwise direction in the ring structure if the value r belongs to the set $\{N/2+1, N/2+2, \ldots, N-d-1\}$.

12. A packet-switched communication network according to claim 11, wherein each routing module performs the following:

routing the data packet to its paired network interface if the index of the corresponding router is equal to the content of the second field of the header of the data packet; and routing the data packet according to the content of the first field of the header of the data packet on a first virtual channel if the index is greater than the content of the second field of the header of the data packet, otherwise on a second virtual channel.

13. A method for operating a packet-switched communication network comprising N network interfaces on a substrate, with N being an even integer, and each network interface to be connected to an element; N routers arranged in a ring structure on the substrate and respectively connected to the N network interfaces; N pairs of opposite uni-directional ring links, with each pair of ring links coupling two adjacent routers in the ring structure, and each ring link providing two virtual channels; and N/2 pairs of opposite uni-directional crossing links, with each pair of crossing links coupling two diametrically opposite routers in the ring structure; and processing circuitry distributed within the N routers and the N network interfaces, the method comprising:

operating the processing circuitry for determining direction of a data packet to be transmitted over a path from a source element to a destination element in the ring structure;

determining at each router in the path which virtual channel is to be used so as to avoid a deadlock with other data packets being transmitted; and defining the path for the transmitted data packet so that the path includes at least one transition in the ring structure between two adjacent routers, or a crossing transition between two diametrically opposite routers followed by a circular path in the ring structure having at least one transition, with a direction of the circular path being identical for all transitions in the circular path;

the data packet comprising a header including a first field defining at least one of the crossing transitions and the direction of the circular path in the ring structure, and a second field defining a destination router;

the processing circuitry comprising N local preprocessing modules respectively in the N network interfaces, with one of the local preprocessing modules being connected to the source element for determining contents of the first and second fields; and the router comprising a routing module for routing the data packet based upon the contents of the first and second fields.

14. A method according to claim 13, wherein the path for the transmitted data packet is defined so that the path comprises at most d transitions between routers, with d being equal to N/4.

15. A method according to claim 13, wherein the N routers are successive and are indexed with consecutive indexes; and wherein a source network interface corresponds to the source element, with the local preprocessing module in the source network interface comprising:

a calculating module for calculating a value r equal to a difference modulo N between a destination index of the destination router and a source index of the source router; and a determining module for determining the content of the first field from the value r.

16. A method according to claim 15, wherein the indexes are increased in a clockwise direction; and wherein the determining module provides the content of the first field with the following:

a first value representative of the clockwise direction in the ring structure if the value r belongs to the set $\{1,2,\ldots,d\}$;

a second value representative of a counter-clockwise direction in the ring structure if the value r belongs to the set $\{N-d, N-d+1, \ldots, N+1\}$;

a third value representative of a crossing in the ring direction if the value r is equal to N/2;

a fourth value representative of the crossing transition between two diametrically opposite routers followed by the counterclockwise direction in the ring structure if the value r belongs to the set $\{d+1, d2\ldots, N/2-1\}$; or a fifth value, representative of the crossing transition between two diametrically opposite routers followed by the clockwise direction in the ring structure if the value r belongs to the set $\{N/2+1, N/2+2, \ldots, N-d-1\}$.

17. A method according to claim 16, wherein each routing module performs the following:
routing the data packet to its paired network interface if the index of the corresponding router is equal to the content of the second field of the header of the data packet; and
routing the data packet according to the content of the first field of the header of the data packet on a first virtual channel if the index is greater than the content of the second field of the header of the data packet, otherwise on a second virtual channel.

* * * * *

UNITED STATES PATENT AND TRADEMARK OFFICE
CERTIFICATE OF CORRECTION

PATENT NO. : 7,555,001 B2  Page 1 of 1
APPLICATION NO. : 11/157562
DATED : June 30, 2009
INVENTOR(S) : Coppola et al.

It is certified that error appears in the above-identified patent and that said Letters Patent is hereby corrected as shown below:

Column 3, Line 59         Delete: "$r_i$) Each"
                          Insert: -- $r_i$). Each --

Column 4, Line 21         Delete: "y-1 < x < y"
                          Insert: -- y-1 < x $\leq$ y --

Column 8, Claim 4         Delete: "counterclockwise"
Line 7                    Insert: -- counter-clockwise --

Column 8, Claim 6         Delete: "unidirectional"
Line 31                   Insert: -- uni-directional --

Column 9, Claim 11        Delete: "the, set"
Line 43                   Insert: -- the set --

Column 10, Claim 16       Delete: ",N+1}"
Line 57                   Insert: -- ,N-1} --

Column 10, Claim 16       Delete: "counterclockwise"
Line 62                   Insert: -- counter-clockwise --

Column 10, Claim 16       Delete: "d2"
Line 63                   Insert: -- d+2 --

Signed and Sealed this

First Day of September, 2009

David J. Kappos
*Director of the United States Patent and Trademark Office*